United States Patent [19]
Blainey

[11] Patent Number: 6,045,585
[45] Date of Patent: Apr. 4, 2000

[54] METHOD AND SYSTEM FOR DETERMINING INTER-COMPILATION UNIT ALIAS INFORMATION

[75] Inventor: Robert James Blainey, North York, Canada

[73] Assignee: International Business Machines Corporation, Armonk, N.Y.

[21] Appl. No.: 08/844,053

[22] Filed: Apr. 18, 1997

[51] Int. Cl.[7] ................................................. G06F 9/45
[52] U.S. Cl. ......................... 717/8; 717/5; 717/7; 717/9
[58] Field of Search ................................. 395/705, 706, 395/707, 708, 709

[56] References Cited

U.S. PATENT DOCUMENTS

| | | | |
|---|---|---|---|
| 5,535,394 | 7/1996 | Burke et al. | 395/700 |
| 5,555,412 | 9/1996 | Besaw et al. | 395/700 |
| 5,581,762 | 12/1996 | Hayashi et al. | 395/709 |
| 5,768,596 | 6/1998 | Chow et al. | 395/709 |
| 5,790,866 | 8/1998 | Robison | 395/709 |

OTHER PUBLICATIONS

Landi et al., "Pointer Induced Ahasing: A Problem Classification," ACM, pp. 93–103, Aug. 1990.
Loelinger et al., "Pointer Target Tracking—An Empirical Study", ACM, pp. 14–23, Jul. 1991.
Dahl et al., "Reducing Memory Traffic with Cregs", Micro 27, ACM pp. 100–104, Nov. 1994.
Landi et al., "Interprocedural Modification Side Effect Analysis with Pointer Aliasing", ACM Sigplan, pp. 56–67, Jun. 1993.

*Primary Examiner*—James P. Trammell
*Assistant Examiner*—Kakali Chaki
*Attorney, Agent, or Firm*—Jay P. Sbrollini

[57] ABSTRACT

A system and method for determining alias information at the inter-compilation unit level of a compilation process includes the steps of determining anti-alias sets from the alias information provided by the first stage of the compilation process, calculating pessimistic inter-compilation unit alias sets and refining these sets, after transitive closure as appropriate, with the anti-alias sets.

11 Claims, 3 Drawing Sheets

METHOD AND SYSTEM FOR DETERMINING INTER-COMPILATION UNIT ALIAS INFORMATION

FIELD OF THE INVENTION

The present invention relates to a method and system for determining dependencies in a program being compiled. More specifically, the present invention relates to a method and system which determines alias information across compilation units of a program being compiled.

BACKGROUND OF THE INVENTION

Much effort has, and is, being expended to improve the program instructions (object code) produced by compilers. Such improvements are generally referred to as optimizations and include a variety of techniques including: in-lining; loop unrolling; instruction reordering; and others. As used herein, the terms "optimize" and/or "optimization" refer to the improvement of the program instructions produced by a compiler to achieve enhanced execution performance of the resulting program. It is not intended that these terms imply that the program is modified to achieve an optimum or optimal set of program instructions, but instead only that a performance increase is obtained over the case wherein the optimizations are not performed.

Most of the optimization techniques developed to date require that the compiler have information regarding the dependencies between various storage locations used by the program. For example, a sequence of instructions in a C program may be as follows:

x=y+z;
*p=*a+*b;
q=y+z;

It may be that, on the specific processor for which this C program is being compiled, a performance improvement can be obtained if the ordering of the last two statements is reversed so that y+z is only calculated once and is assigned to both x and q. However, without additional information, the compiler cannot reverse the ordering of the last two instructions as it is possible that the pointer p in fact points to y or z, and thus is intended to change the value of y or z before the assignment of the value of y+z to q, or that a or b point to q, which has previously had a value assigned to it and thus the value of y+z cannot be assigned to q before the value *a+*b is assigned through p.

Generally, a symbol (storage location or a variable) which may share storage with another symbol is referred to as an "alias" of, or is said to be "aliased with", the other symbol. Determining which symbols are aliased with which other symbols is very important when attempting to optimize object code as such information generally affects the potency of almost all optimizations which can be performed. Essentially, without precise alias information many potential optimizations will be missed or, if identified, must be ignored.

As will be apparent to those of skill in the art, there are essentially three categories of alias information that are represented in a compiler, each of which is described below. In general, alias information is symmetric (i.e.—if 'x' is an alias of 'y',then 'y' is also an alias of 'x'),reflexive (i.e.—'x' is an alias of itself) and is transitive (i.e.—it can be shown that, if 'x' is an alias for 'y' and 'y' is an alias for 'z','z' is an alias of 'x'). The exception to the general case of alias symmetry is 'uses' of storage locations in call induced aliasing, which is discussed below in more detail. The exception to the general case of alias transitivity is structural aliasing, which is also discussed below in more detail.

Structural aliasing information comprises the situation wherein two symbols are mapped to overlying regions in memory. In many language models, structural aliasing only occurs between members of an aggregate symbol (such as a union or a structure in C) or between the members and the aggregate symbol which contains them. As mentioned above, structural induced aliases are not transitive. For example in a C union defined as

```
union{
    struct{
        int i;
        int j;
    }
    float f;
};
``` wherein i and j are mapped to adjoining locations and f is mapped to the combination of those locations, f is aliased with each of i and j but i and j are not aliased to each other.

Call induced aliasing results from the fact that a called procedure can reference storage locations which are accessible to the calling procedure. For example, a C function can modify the value of a variable defined as an extern data type in which case the function is aliased with the extern variable.

Pointer induced aliasing results from storage locations which are referenced through pointer indirection.

Typically, in at least one early stage of a compilation process, the compiler can determine alias information with reasonable precision using the rules of the language being compiled. For example, in ANSI standard C, a pointer to an integer value is precluded from pointing to a floating point value. Accordingly, a compiler can precisely determine that, for example in the code fragment above, if p has been declared as a pointer to a floating point data type and x is declared as an integer data type (which also means that y, z and q are also integer data types), then *p cannot point to x and thus they are not aliased. Similarly, x, y and z cannot be aliased with a, b or *p and the order of the last two instructions in the fragment can be reversed if desired.

It is relatively easy to obtain precise aliasing information which is based upon: language rules (eg.—a pointer to a float data type cannot point to an integer data type); language features (eg.—FORTRAN 90's TARGET attribute); or explicit assertions to the compiler made by the programmer (eg.—an ANSI C pragma that specifies that a procedure does not modify external storage locations). However, such is not the case for later stages in the compilation process. Specifically, once the compilation process proceeds beyond compiling separate compilation units, precise alias information has been difficult to obtain. As an example, it has generally not been possible to determine if a pointer in one compilation unit is aliased with a storage location in another compilation unit.

As used herein, the term "compilation unit" is intended to comprise any block of program code which is processed independently of other units of program code in the first stage of a compilation process. As used herein, the term "first stage of a compilation process" comprises the stage in the compilation process wherein the compiler is operating on language-specific instructions, rather than on instructions in a non-language specific intermediate instructions. For example, a single file of source code, a single function definition (whether defined in its own file or grouped with other function definitions in a file), etc. are compilation units. As will be apparent to those of skill in the art, compilation units can also comprise such blocks of a program which are written in different languages. For example, the user interface portions of a program may be written in C++ while mathematical functions in the program may be written in Fortran 90.

In the prior art of which the present inventor is aware, attempts to derive alias information between multiple compilation units, referred to herein as inter-compilation unit analysis, have been limited except for structural aliasing. In many circumstances, such attempts have provided no additional information and in some circumstances have resulted in the loss of alias information which was otherwise available from the earlier stages of the compilation process.

An example of a prior art attempt at improving alias information at the inter-compilation unit level is shown in U.S. Pat. No. 5,146,594 to Iitsuka. This patent teaches a technique for computing alias information for procedures which is alleged to be more precise than that obtained in the prior art. The technique discriminates between cases wherein a symbol may share storage with another symbol and cases wherein the symbol must share storage with another symbol.

SUMMARY OF THE INVENTION

It is an object of the present invention to provide a novel method and system of determining alias information at the inter-compilation unit level for use in optimizing program instructions produced by a compiler.

According to a first aspect of the present invention, there is provided a method of determining alias information at the inter-compilation unit level of a compilation process for a computer program, comprising the steps of:

(i) constructing sets of anti-alias information comprising the amalgamation of the complements of respective alias sets provided by a first stage of a compilation process, a shadow variable being assigned to each pointer induced alias;

(ii) determining sets of inter-compilation unit alias information;

(iii) determining refined sets of inter-compilation unit alias information by removing aliases included in the respective anti-alias sets;

(iv) augmenting the determined sets of inter-compilation unit alias information to include shadow to shadow aliasing determined by adding any intersection of the refined sets of inter-compilation unit alias information for each shadow variable with the respective refined set of inter-compilation unit alias information; and (v) reducing the resulting augmented sets of inter-compilation unit alias information by removing alias information in the respective anti-alias information sets to obtain final sets of inter-compilation alias information.

According to another aspect of the present invention, there is provided a method of determining alias information at the inter-compilation unit level of a compilation process for a program, comprising the steps of:

(i) constructing sets of anti-alias information [AntiAlias( )] comprising the amalgamation of the complements of respective alias sets provided by a first stage of a compilation process, a shadow variable being assigned to each pointer induced alias;

(ii) determining sets of inter-compilation unit alias information [ICUAlias( )];

(iii) determining refined sets of inter-compilation unit alias information [RAlias( )] from RAlias(x)=ICAlias(x)−AntiAlias(x)

;and (iv) determining final sets of inter-compilation unit alias information [FAlias( )] from FAlias(x)=ICAlias(x)∪{s|s is a shadow and
RAlias(s)∩RAlias(x)≠NULL})−AntiAlias(x)

According to yet another aspect of the present invention, there is provided an article of manufacture comprising a computer usable medium having computer readable program code means embodied therein for implementing a compiler for a computer program including means to determine alias information at the inter-compilation unit level, the computer readable program code means in said article of manufacture comprising:

computer readable program code means for constructing sets of anti-alias information comprising the amalgamation of the complements of respective alias sets provided by a first stage of a compilation process, a shadow variable being assigned to each pointer induced alias;

computer readable program code means for determining sets of inter-compilation unit alias information;

computer readable program code means for determining refined sets of inter-compilation unit alias information by removing aliases included in the respective anti-alias sets;

computer readable program code means for augmenting the determined sets of inter-compilation unit alias information to include shadow to shadow aliasing determined by adding any intersection of the refined sets of inter-compilation unit alias information for each shadow variable with the respective refined set of inter-compilation unit alias information; and computer readable code means for reducing the resulting augmented sets of inter-compilation unit alias information by removing alias information in the respective anti-alias information sets to obtain final sets of inter-compilation alias information.

According to yet another aspect of the present invention, there is provided a computer implemented process for determining alias information at the inter-compilation unit level of a compilation process for a computer program, comprising the steps of:

(i) constructing sets of anti-alias information [AntiAlias( )] comprising the amalgamation of the complements of respective alias sets provided by a first stage of a compilation process, a shadow variable being assigned to each pointer induced alias;

(ii) determining sets of inter-compilation unit alias information [ICUAlias( )];

(iii) determining refined sets of inter-compilation unit alias information [RAlias( )] from $$RAlias(x)=ICAlias(x)-AntiAlias(x)$$

; and (iv) determining final sets of inter-compilation unit alias information [FAlias( )] from $$FAlias(x)=ICAlias(x) \cup \{s|s \text{ is a shadow and} \\ RAlias(s) \cap RAlias(x) \neq NULL\})-AntiAlias(x)$$

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
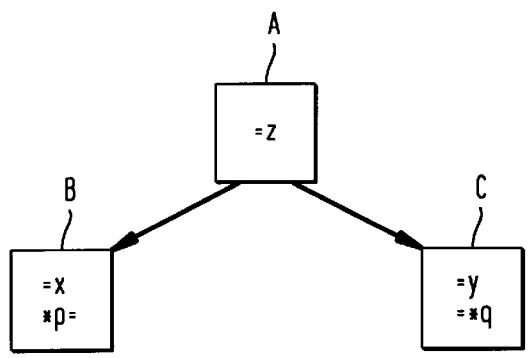
FIG. 1 shows a call graph for a portion of a program.

In the present invention, when considering pointer induced aliasing, an unmapped symbol, referred to as a shadow variable, is used to represent the set of storage locations which are possibly referenced through the pointer indirection, with a different shadow variable being employed at each point in the program wherein a reference through pointer indirection occurs. Pointer induced aliases may exist between two shadows (for example, two pointers can point to overlapping storage locations) or between a shadow and a mapped symbol (for example, a pointer can point to a storage location which is overlapped with a storage location which is allocated for a mapped symbol).

In determining alias information at the inter-compilation unit level, there are two different types of program information which must be considered, the visible portion of the program and the invisible portion of the program. The visible portion of the program comprise those compilation units for which the compiler has detailed information (such as storage location type definitions, uses, etc.) The invisible portion of the program comprises the compilation units for which the compiler has little or no information, such as libraries, etc. In the present invention, the data owned by the invisible portion of a program is referred to as the 'universal object' as is represented by a shadow symbol.

Generally, the alias sets derived for pointer induced aliasing at the inter-compilation unit level are more pessimistic (conservative) than those derived at the compilation unit stage. At the inter-compilation unit level, the compiler must assume that any shadow in a visible compilation unit is aliased with all mapped storage locations whose addresses are explicitly taken in the visible portion of the program. The compiler must also assume that any shadow is aliased with the universal object, since no information to the contrary is available. Finally, for similar reasons, the compiler must also assume that any storage locations owned by the visible portion of the program, and which are possibly referenced by the invisible portion, may have had their addresses taken and are aliased with the universal object.

While the discussion above assumes a worse case situation, it should be noted that it is often possible to identify some disjointly mapped members of the universal object which have been created by well-defined memory allocation procedures, for example with C's malloc( ) function and Pascal's new( ) function.

In the present invention, pointer induced alias information is determined at the inter-compilation unit level as follows. First, alias information based on language rules, features and/or programmer assertions is obtained in the first stage of the compilation process. Essentially, alias information is derived, using conventional techniques, for each shadow in each compilation unit and the resulting sets are referred to herein as Alias(x), where x is the shadow of interest. These Alias( ) sets contain each shadow or mapped symbol with which the shadow of interest is aliased.

Next, each Alias(x) set is processed to determine its complement, referred to herein as AntiAlias(x). These AntiAlias( ) sets therefore indicate which shadows and mapped symbols are not aliased with the shadow of interest, as determined by the first stage of the compilation process. As the alias information obtained in the first stage is conservative, an alias being assumed unless evidence exists to the contrary, the AntiAlias( ) sets provide definitive information regarding the absence of aliases between shadows and other shadows or mapped symbols.

Next, pessimistic alias information is obtained at the inter-compilation unit level and the resulting alias sets are referred to herein as ICAlias( ) sets. Essentially, this pessimistic analysis is conducted by examining the program instructions after the first stage of the compilation process and constructing ICAlias( ) sets for: each object whose address is taken or which may have its address taken in the visible portion; each object which may have had its address taken in the invisible portion; external variables which may have their address taken; symbols which are structurally aliased; and any exported data.

It will be apparent that the pessimistic ICAlias( ) sets which result from the analysis can often be somewhat refined through otherwise conventional data flow analysis and/or other refinements, as would occur to those of skill in the art. While such refinement is not required in the present invention, it is preferred as it can produce alias information which is more precise.

Once the ICAlias( ) sets are obtained from the analysis at the inter-compilation unit level, and whether refined by data flow analysis, etc. or not, the ICAlias( ) sets are further refined, as described below, to obtain refined alias sets referred to herein as RAlias( ) sets. These RAlias( ) sets are derived from $$RAlias(x)=ICAlias(x)-AntiAlias(x)$$

i.e.—the ICAlias( ) sets are reduced, if possible, by employing the information provided from the first stage of the compilation process as to which objects are not aliased with which other objects.

As the resulting RAlias( ) sets do not reflect shadow to shadow aliasing, the final inter-compilation unit alias sets, referred to herein as FAlias( ) sets, are formed from $$FAlias(x)=ICAlias(x) \cup \{s|s \text{ is a shadow and} \\ RAlias(s) \cap RAlias(x) \neq NULL\})-AntiAlias(x)$$

i.e.—the ICAlias( ) sets are augmented with the shadow to shadow aliases indicated in the RAlias( ), employing the transitive property of pointer induced aliasing (i.e.— transitive closure), and the resulting augmented sets are reduced by the AntiAlias( ) sets to obtain FAlias( ) sets. It should be noted that the equation above for FAlias( ) cannot be simplified by distribution since the AntiAlias( ) sets may contain shadow variables with non-null RAlias( ) intersection sets.

One of the advantages of the inter-compilation unit pointer-induced alias analysis of the present invention is that the alias representation discussed above is independent of the representation of the actual program and can thus be manipulated without altering the program until the representation is passed on to the next stage of the compilation process.

Call induced aliasing is determined at the inter-compilation unit level with a similar representation. FIG. 1 shows a call graph wherein procedure A can call blocks (procedures) B and C. Four Alias sets are determined for each non-leaf node in such a call graph, an Immediate and an Indirect 'use' set and an Immediate and an Indirect 'def' set. In general, immediate alias sets represent aliased objects within the block and indirect alias sets represent the aliased immediate objects and all aliased objects of the child nodes of the block. For each leaf node, which have no child nodes, the immediate set is the indirect set and thus only a use and a def alias set are determined.

In FIG. 1, block A has: an Immediate use set={z}; an Indirect use set={*q, x, y, z}, wherein *q is a shadow; an Immediate def set=Null; and an Indirect def set={*p} wherein *p is a shadow. Similarly, block B has a use set={x} and a def set={*p}. As will be apparent to those of skill in the art, shadow to shadow aliasing is only considered later, at the point of transitive closure of the alias sets.

In fact, in Block B *p could reference {x, y, z} but rather than expanding the def set from the shadow {*p} to {x, y, z}, the shadow object is maintained during the analysis stage until the aliasing information is required. At that point, expansions of shadows are performed as necessary, employing the above-mentioned FAlias( ) sets.

It should be noted that, as mentioned above, 'uses' of symbols in call induced aliasing are not symmetric. Thus, if a procedure uses a symbol but does not define it, the alias set is asymmetric and the procedure will not be found in the alias set for the symbol while the symbol will be found in the alias set of the procedure.

It will be apparent to those of skill in the art that calculating inter-compilation unit call induced alias information is generally computationally expensive (being an operation of order $n^3$) and requires relatively large temporary storage space as the alias information for n objects requires an n by n array of objects. Accordingly, in a preferred embodiment of the present invention, the final determination of the call induced alias sets is conducted on an "as needed" basis, as described below. Further, a record is maintained of which alias sets have been determined to ensure that no redundant calculations are performed.

Figure 2:
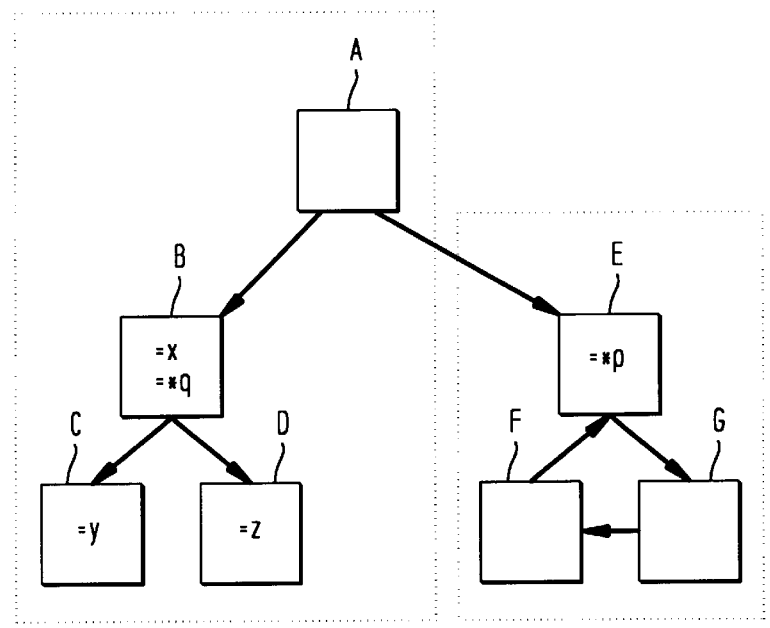
FIG. 2 shows another call graph for a portion of a program.

In a preferred embodiment of the invention, alias and other program information is passed from the inter-compilation unit level analysis process to the next stage of the compilation stage in partitions. FIG. 2 shows another call graph wherein each of two partitions is encircled by a dashed line. As shown, blocks A, B, C and D are in one partition and blocks E, F and G are in the other. As will be understood by those of skill in the art, by partitioning the portions of the program passed to the next stage of the compilation process, a tradeoff is made between compilation requirements (time and storage space) and the degree of optimization obtained. Specifically, by partitioning the information, the scope of the program which needs to be considered for aliases can be reduced but this also results in a reduced scope within which optimizations may be performed.

Accordingly, with partitioning it is possible to determine which alias information is going to be useful to the next stage of the compilation process and which is not and to only complete the determination of the alias information which is useful, thus reducing compilation requirements.

Figure 3:
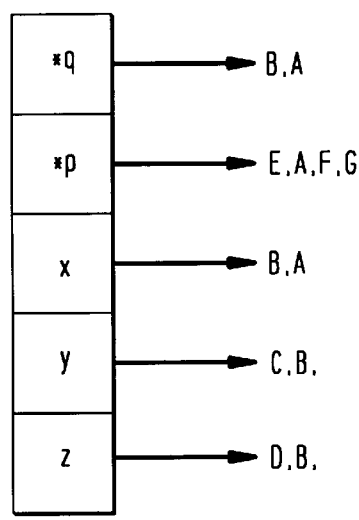
FIG. 3 shows a table of symbol vectors.

Also, it has been found to be advantageous to store the call induced alias information in vectors relating each symbol to the block(s) which use (or define) it, rather than a vectors relating each block to the symbols they use (or define). FIG. 3 shows a portion of such a table of vectors for each symbol in the example of FIG. 2, each vector indicating the blocks which use (or define) the symbol. In this manner, the need to compute the complete transitive closure of the def and use sets is eliminated.

If, for example, we know from the pointer induced alias sets FAlias( ) described above that x is aliased with *p, then a check of the block vector for *p relatively easily reveals that x is aliased with E, due to call induced alias transitivity. Similarly, it can be easily determined that E is also aliased with *q if *q is in FAlias(*p).

However, in the example of FIGS. 2 and 3, because block E is in a different partition, alias information regarding x and *p and/or *q and *p will not be required by the next stage of the compilation process and thus need not be explicitly represented. In general, wherein partitioning is employed, only a reduced set of alias information will be useful.

As is known to those of skill in the art, unlike pointer induced and call induced aliasing information, it is relatively easy to determine structural alias information at the inter-compilation unit level. For example, in a C union structure, such as

```
union {
    int i
    int j;
} u;
``` when u.i or u.j is accessed the symbol table produced by the compiler includes the symbol for u, the offset from u for the desired element of the union and the length of the desired element of the union and thus the necessary aliasing information can be determined. For example, when u.i is used the symbol table includes {u, 0, 4}, for systems wherein the length of an integer data type is four bytes.

In the present invention, structural aliasing is determined using conventional techniques, as will be understood by those of skill in the art, but the analysis is conducted at the inter-compilation unit level.

Figure 4:
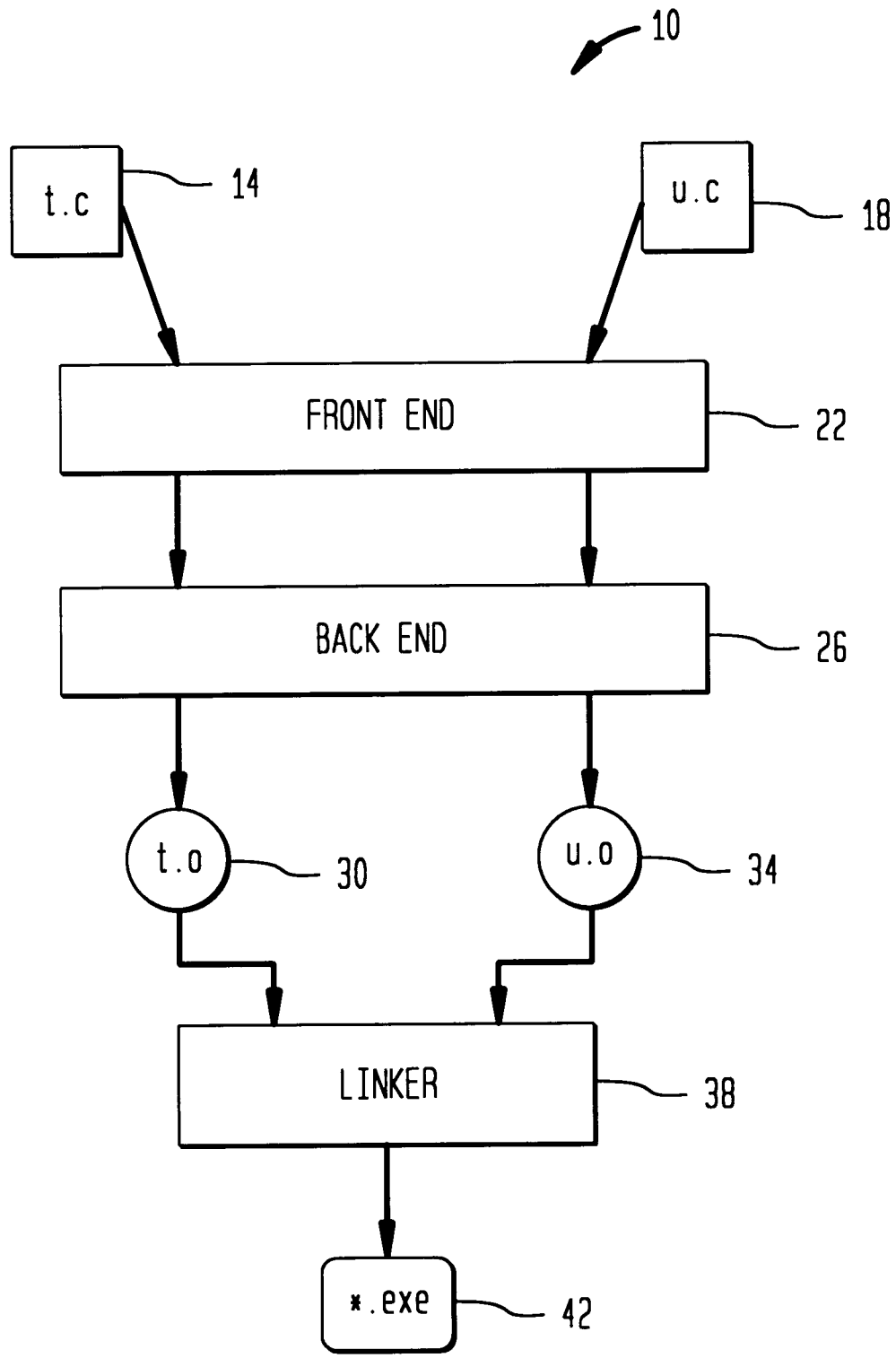
FIG. 4 shows a block diagram of a prior art compiler.

FIG. 4 shows a block diagram of a prior art compiler 10 wherein two source files, t.c 14 and u.c 18 are to be compiled. Compiler 10 can, for example, be the AIX CSet++ compiler distributed by IBM. The operation and various aspects of this compiler and other suitable compilers have been documented elsewhere and will not be further discussed herein.

Each source file 14, 18 is processed by the compiler front end stage 22 which converts the source files from their source language (such as C in this example) to an intermediate language. These intermediate language files are next processed by the compiler back end 26 which creates corresponding object files t.o 30 and u.o 34 which are suitable for linking by linker 38 to produce an executable file 42.

Figure 5:
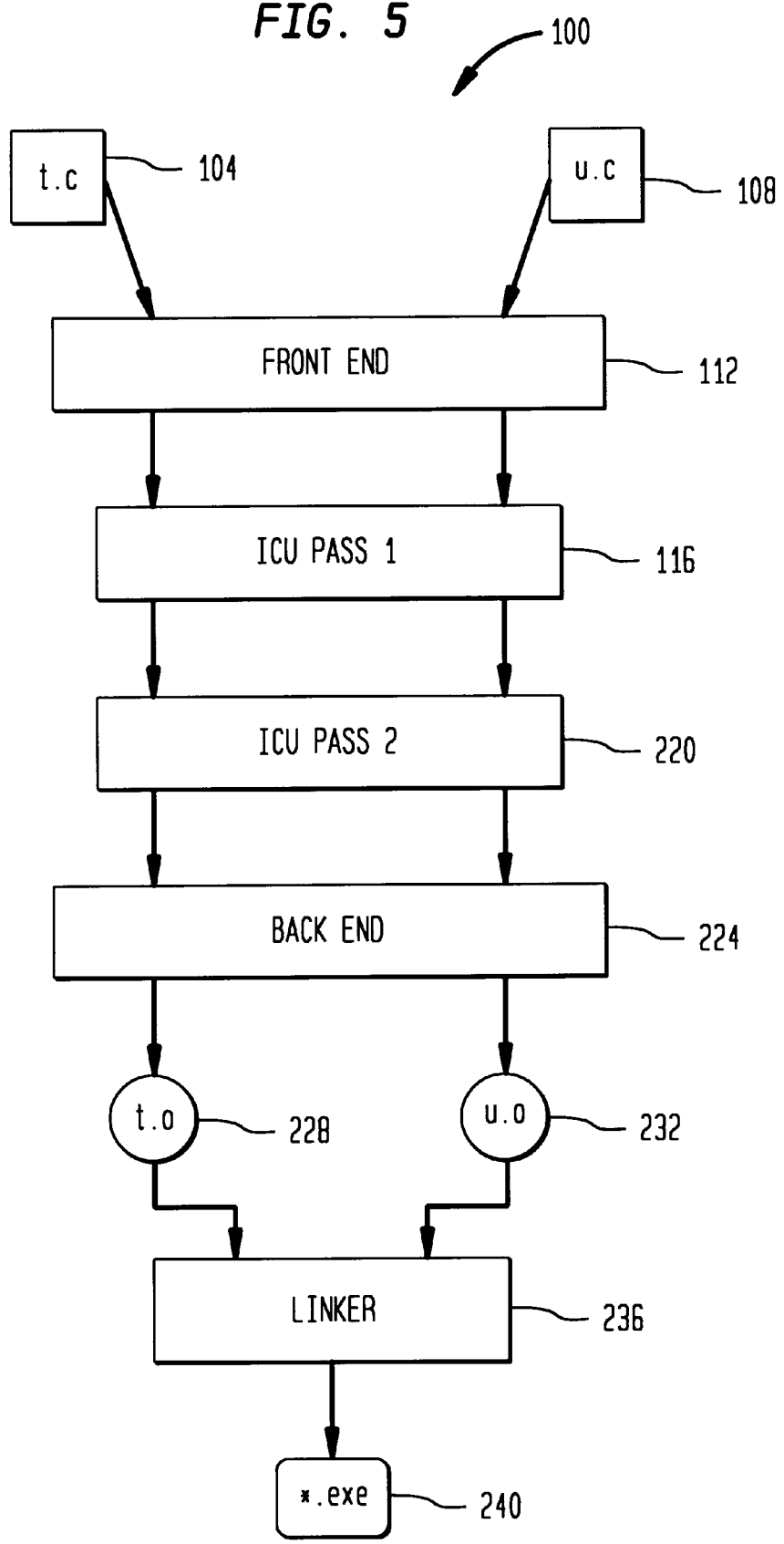
FIG. 5 shows a compiler in accordance an embodiment of the present invention.

FIG. 5 shows a block diagram of a compiler 100, in accordance with the present invention, wherein two source files t.c 104 and u.c 108 are to be compiled. Each source file 104, 108 is processed by front end 112 to an intermediate language in a similar manner to the processing performed by front end 22 of prior art compiler 10. In fact, in the presently preferred embodiment of the invention, front end 112 is identical to the prior art front end 22.

The intermediate language which is produced by front end 112 is processed by Inter-Compilation Unit Analysis (ICU) Pass 1 module 116 which analyzes the intermediate language and produces augmented intermediate language files. Specifically, the files are augmented with additional information, including the AntiAlias( ) sets, which is passed to ICU Pass 2 module 220.

ICU Pass 2 module 220 completes the inter-compilation unit analysis and produces the intermediate language files with the FAlias( ) and call induced and structural alias information for the compiler back end 224. In the presently preferred embodiment of the invention, compiler back end 224 is identical to the prior art compiler back end 26, as the intermediate language files and the alias information provided by ICU Pass 2 module 220 is in the same format as in prior art compiler 10. The only difference in this case, is that the alias information has now be determined at the inter-compilation unit level and is generally less pessimistic than in the prior art. Compiler back end 224 produces object files t.o 228 and u.o 232 which are suitable for linking by linker 236 to produce an executable file 240.

By improving the alias information available to subsequent stages of the compilation process, the present invention provides for enhanced optimization opportunities for the program instructions produced by the compilation process. While inter-compilation aliasing information can be obtained, aliasing information from the front end of the compilation process is not degraded.

The above-described embodiments of the invention are intended to be examples of the present invention and alterations and modifications may be effected thereto, by those of skill in the art, without departing from the scope of the invention which is defined solely by the claims appended hereto.

I claim:

1. A method of determining alias information at the inter-compilation unit level of a compilation process for a computer program, comprising the steps of:
   (i) constructing sets of anti-alias information comprising the amalgamation of the complements of respective alias sets provided by a first stage of a compilation process, a shadow variable being assigned to each pointer induced alias;
   (ii) determining sets of inter-compilation unit alias information;
   (iii) determining refined sets of inter-compilation unit alias information by removing aliases included in the respective anti-alias sets;
   (iv) augmenting the determined sets of inter-compilation unit alias information to include shadow to shadow aliasing determined by adding any intersection of the refined sets of inter-compilation unit alias information for each shadow variable with the respective refined set of inter-compilation unit alias information;
   (v) reducing the resulting augmented sets of inter-compilation unit alias information by removing alias information in the respective anti-alias information sets to obtain final sets of inter-compilation alias information;
   (vi) generating a representation of said program based upon said final sets, and storing said representation in at least one file.

2. The method defined in claim 1 wherein step (ii) comprises constructing the pessimistic alias sets for each object in the results of the first stage of the compilation process whose address is taken in the program or which may have had its address taken in the program, for each external variable which may have its address taken in the program and any exported data.

3. The method of claim 2 wherein step (ii) further comprises the step of reducing the determined sets of inter-compilation unit alias information via data flow analysis of the program being compiled.

4. The method of claim 1 further comprising the steps of:
   (I) determining a call graph for the program;
   (II) determining immediate use and def sets for each node in said call graph and indirect use and def sets for each non-leaf node in said call graph, said sets including shadow variables determining pointer induced aliases;
   (III) maintaining a vector for each symbol at the inter-compilation unit level, each vector indicating the nodes in the call graph which reference the respective symbol;
   (IV) calculating call induced alias information from said vectors and from said final sets of inter-compilation alias information; and
   wherein said representation of said program is based upon said call induced alias information.

5. The method of claim 4 further comprising the steps of:
   (a) partitioning the program at the inter-compilation unit level into one or more partitions which are forwarded separately to the next stage of the compilation process;
   (b) determining which call induced alias information will not be useful by said next stage of the compilation process due to said partitioning; and
   (c) performing step (IV) only for the call induced alias information which is useful.

6. The method of claim 5 further comprising the step of maintaining a record of which call induced alias information has been calculated in step (IV) to inhibit redundant calculations.

7. A method of determining alias information at the inter-compilation unit level of a compilation process for a program, comprising the steps of:
   (i) constructing sets of anti-alias information [AntiAlias( )] comprising the amalgamation of the complements of respective alias sets provided by a first stage of a compilation process, a shadow variable being assigned to each pointer induced alias;
   (ii) determining sets of inter-compilation unit alias information [ICUAlias( )];
   (iii) determining refined sets of inter-compilation unit alias information [RAlias( )] from $$RAlias(x) = ICAlias(x) - AntiAlias(x)$$

(iv) determining final sets of inter-compilation unit alias information [FAlias( )] from $$FAlias(x) = ICAlias(x) \cup \{s | s \text{ is a shadow and } RAlias(s) \cap RAlias(x) \neq NULL\}) - AntiAlias(x)$$

(iv) generating a representation of said program based upon said final sets, and storing said representation in at least one file.

8. The method of claim 7 further comprising the steps of:
   (I) determining a call graph for the program;
   (II) determining immediate use and def sets for each node in said call graph and indirect use and def sets for each non-leaf node in said call graph, said sets including shadow variables determining pointer induced aliases;

(III) maintaining a vector for each symbol at the inter-compilation unit level, each vector indicating the nodes in the call graph which reference the respective symbol;

(IV) calculating call induced alias information from said vectors and from said final sets of inter-compilation alias information; and wherein said representation of said program is based upon said call induced alias information.

9. An article of manufacture comprising a computer usable medium having computer readable program code means embodied therein for implementing a compiler for a computer program including means to determine alias information at the inter-compilation unit level, the computer readable program code means in said article of manufacture comprising:

computer readable program code means for constructing sets of anti-alias information comprising the amalgamation of the complements of respective alias sets provided by a first stage of a compilation process, a shadow variable being assigned to each pointer induced alias;

computer readable program code means for determining sets of inter-compilation unit alias information;

computer readable program code means for determining refined sets of inter-compilation unit alias information by removing aliases included in the respective anti-alias sets;

computer readable program code means for augmenting the determined sets of inter-compilation unit alias information to include shadow to shadow aliasing determined by adding any intersection of the refined sets of inter-compilation unit alias information for each shadow variable with the respective refined set of inter-compilation unit alias information;

computer readable code means for reducing the resulting augmented sets of inter-compilation unit alias information by removing alias information in the respective anti-alias information sets to obtain final sets of inter-compilation alias information; and computer readable code means for generating a representation of said program based upon said final sets, and for storing said representation in at least one file.

10. A computer implemented process for determining alias information at the inter-compilation unit level of a compilation process for a computer program, comprising the steps of:

(i) constructing sets of anti-alias information [AntiAlias( )] comprising the amalgamation of the complements of respective alias sets provided by a first stage of a compilation process, a shadow variable being assigned to each pointer induced alias;

(ii) determining sets of inter-compilation unit alias information [ICUAlias( )];

(iii) determining refined sets of inter-compilation unit alias information [RAlias( )] from $$RAlias(x)=ICAlias(x)-AntiAlias(x),$$

(iv) determining final sets of inter-compilation unit alias information [FAlias( )] from $$FAlias(x)=ICAlias(x)\cup\{s|s \text{ is a shadow and } RAlias(s)\cap RAlias(x)\neq NULL\})-AntiAlias(x)$$

(v) generating a representation of said program based upon said final sets, and storing said representation in at least one file.

11. The process defined in claim 10 wherein step (ii) further comprises conducting a data flow analysis of the program being compiled to reduce the determined sets of inter-compilation unit alias information.

* * * * *